United States Patent
Bar-Nissan et al.

(10) Patent No.: US 11,321,275 B2
(45) Date of Patent: May 3, 2022

(54) TECHNOLOGIES FOR MIGRATING CONTENT ITEMS FROM A SERVER ON A NETWORK TO AN ONLINE CONTENT MANAGEMENT SYSTEM

(71) Applicant: DropBox, Inc., San Francisco, CA (US)

(72) Inventors: Gal Bar-Nissan, Tel Aviv (IL); Noy Berger, Haifa (IL); Sharon Nadler, Netanya (IL); Itzhak Kasovitch, Holon (IL); Doron Jacoby, Hofit (IL); Meital Gelbort, Tel Aviv (IL); Paulo Rodriguez, Dublin (IE)

(73) Assignee: Dropbox, Inc., San Francisco, CA (US)

( * ) Notice: Subject to any disclaimer, the term of this patent is extended or adjusted under 35 U.S.C. 154(b) by 268 days.

(21) Appl. No.: 16/700,503

(22) Filed: Dec. 2, 2019

(65) Prior Publication Data
US 2021/0165759 A1   Jun. 3, 2021

(51) Int. Cl.
*G06F 16/00* (2019.01)
*G06F 16/11* (2019.01)
(Continued)

(52) U.S. Cl.
CPC .......... *G06F 16/119* (2019.01); *G06F 3/0637* (2013.01); *G06F 11/1446* (2013.01);
(Continued)

(58) Field of Classification Search
CPC .. G06F 16/119; G06F 16/1824; G06F 16/176; G06F 16/1734; G06F 16/134;
(Continued)

(56) References Cited

U.S. PATENT DOCUMENTS 5,495,607 A    2/1996   Pisello et al.
8,484,161 B2   7/2013   Baker et al.
(Continued)

FOREIGN PATENT DOCUMENTS

WO   WO2011002777 A2 *   1/2011
WO   WO2011112359 A2 *   9/2011
(Continued)

OTHER PUBLICATIONS

K.T. Pollack et al., "Efficient access control for distributed hierarchical file systems", 22nd IEEE / 13th NASA Goddard Conference on Mass Storage Systems and Technologies (MSST'05),2005, pp. 1-8.*

*Primary Examiner* — Srirama Channavajjala
(74) *Attorney, Agent, or Firm* — Polsinelli PC

(57) ABSTRACT

Technologies for migrating content items from a storage network to an online content management system are provided. In some examples, a method can include receiving a request to migrate a share on a server at a source environment to a content management system that is separate from the source environment, the share having a structure representing a hierarchy of each content item within the share; identifying accounts at the source environment having access permissions configured at the source environment for the share on the server; mapping the accounts at the source environment to corresponding accounts at the content management system; creating a copy of the share at the content management system, the copy of the share being created in association with the corresponding accounts on the content
(Continued)

management system; and migrating, to the content management system, the access permissions configured at the source environment for the share on the server.

20 Claims, 11 Drawing Sheets

(51) Int. Cl.
| | | |
|---|---|---|
| *G06F 16/176* | (2019.01) | |
| *G06F 16/182* | (2019.01) | |
| *G06F 11/14* | (2006.01) | |
| *G06F 21/62* | (2013.01) | |
| *G06F 16/17* | (2019.01) | |
| *G06F 16/10* | (2019.01) | |
| *G06F 3/06* | (2006.01) | |
| *G06F 16/185* | (2019.01) | |
| *G06F 16/16* | (2019.01) | |

(52) U.S. Cl.
CPC .......... *G06F 11/1471* (2013.01); *G06F 16/10* (2019.01); *G06F 16/122* (2019.01); *G06F 16/168* (2019.01); *G06F 16/176* (2019.01); *G06F 16/1734* (2019.01); *G06F 16/185* (2019.01); *G06F 16/1824* (2019.01); *G06F 21/6218* (2013.01)

(58) Field of Classification Search
CPC ........ G06F 16/958; G06F 16/10; G06F 16/14; G06F 16/168; G06F 16/182; G06F 16/16; G06F 16/178; G06F 16/185; G06F 11/1446; G06F 11/1471; G06F 11/203; G06F 21/6218; G06F 21/316; G06F 21/604; G06F 21/606; G06F 21/6209; G06F 3/0482; G06F 3/04842; G06F 3/04847; H04L 63/101; H04L 63/083; H04L 63/10; H04L 63/104; H04L 63/105; H04L 67/06; H04L 67/10; H04L 67/1095; H04L 12/2856; H04N 1/00159

See application file for complete search history.

(56) References Cited

U.S. PATENT DOCUMENTS

| | | | |
|---|---|---|---|
| 8,862,600 B2 | 10/2014 | Nagarajan et al. | |
| 8,868,523 B2 | 10/2014 | Agetsuma et al. | |
| 8,931,061 B2 * | 1/2015 | Sundaram | G06F 9/5061 |
| | | | 709/200 |
| 9,235,356 B2 | 1/2016 | Backa | |
| 9,251,464 B1 * | 2/2016 | Kellas-Dicks | G06F 21/316 |
| 9,300,652 B2 * | 3/2016 | Sanso | H04L 63/0807 |
| 9,430,483 B1 | 8/2016 | Cowan et al. | |
| 9,455,871 B1 * | 9/2016 | Chheda | H04L 41/0826 |
| 9,716,753 B2 * | 7/2017 | Piyush | H04L 67/1095 |
| 10,229,134 B2 | 3/2019 | Chiu | |
| 10,242,010 B2 | 3/2019 | Heard et al. | |
| 10,860,964 B2 * | 12/2020 | Brower, Jr. | G06F 16/22 |
| 10,868,865 B2 * | 12/2020 | Shadmon | H04L 67/1097 |
| 10,956,972 B2 * | 3/2021 | Miyamoto | G06Q 20/40 |
| 2004/0199514 A1 * | 10/2004 | Rosenblatt | H04L 51/08 |
| 2007/0233647 A1 * | 10/2007 | Rawat | G06F 21/6218 |
| 2008/0097998 A1 * | 4/2008 | Herbach | G06F 17/00 |
| 2008/0154903 A1 * | 6/2008 | Crowley | G06F 16/182 |
| 2013/0226876 A1 * | 8/2013 | Gati | G06F 16/119 |
| | | | 707/652 |
| 2014/0122547 A1 * | 5/2014 | Agetsuma | H04L 67/1097 |
| | | | 707/827 |
| 2014/0282938 A1 * | 9/2014 | Moisa | G06F 16/1827 |
| | | | 726/6 |
| 2014/0379648 A1 * | 12/2014 | Chiu | G06F 16/178 |
| | | | 707/624 |
| 2016/0050257 A1 | 2/2016 | Cassidy | |
| 2019/0244500 A1 * | 8/2019 | Fisher | G08B 13/19673 |

FOREIGN PATENT DOCUMENTS

| | | | |
|---|---|---|---|
| WO | WO2014153540 A1 * | 9/2014 | |
| WO | WO2016178088 A2 * | 12/2016 | |
| WO | WO2016196143 A1 * | 12/2016 | |

\* cited by examiner

| Namespace/Directory | Access Control List |
|---|---|
| Member 1 (ns_id=45) | Owner (Member 1) |
| Marketing (ns_id=2) | Write (Marketing Team) |
| Folder A (ns_id=2, dir_id=100) | Write (Marketing), Read (Member 1) |
| Engineering (ns_id=3) | Write (Engineering) |
| Product (ns_id=5) | Write (Product) |

TECHNOLOGIES FOR MIGRATING CONTENT ITEMS FROM A SERVER ON A NETWORK TO AN ONLINE CONTENT MANAGEMENT SYSTEM

TECHNICAL FIELD

The present technology generally pertains to migrating data from a file server on a network to a cloud storage system.

BACKGROUND

Online storage systems and accounts enable users to maintain a variety of content items in a safe and secure location, such as the cloud, where the users can access the content items at any time from any computing device. Some online storage systems allow users to share content items with other users and access content items in a collaborative fashion. Moreover, some online storage systems may support synchronization of copies of content items across a number of client devices and servers so each copy of a content item is identical and locally accessible from the client devices. Such synchronization functionality can enable users to store local copies of the content items on their client devices and access the local copies from their client devices. The local copies of the content items can be synchronized with the content items on the online storage systems to ensure consistency between local and online copies of the content items. The local copies of the data may provide users with faster access to the data and may allow users to access the data when their client devices are offline.

Often times, users may also have other content items stored on other locations, such as a file server on an enterprise network. However, having different content items stored on different systems and accessible only from the different systems can be inefficient, confusing, and difficult to manage. Moreover, while having the different content items accessible and synchronized through a centralized system, such as an online storage system, can be much more efficient, manageable, and user friendly, copying content from a source location to an online storage system can be time consuming, cumbersome, and error prone. For example, users may have to manually upload the content to the online storage system and deal with long upload times. In addition, users may also have to reorganize the uploaded content into an appropriate directory structure or file hierarchy in the online storage system. In many cases, users may encounter upload errors; system incompatibilities; conflicts, inconsistencies, or incompatibilities with content permissions; etc.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 shows an example access control list configured at a content management system for folders created at the content management system based on shares migrated from a source environment, in accordance with some examples;

DETAILED DESCRIPTION

Figure 1:
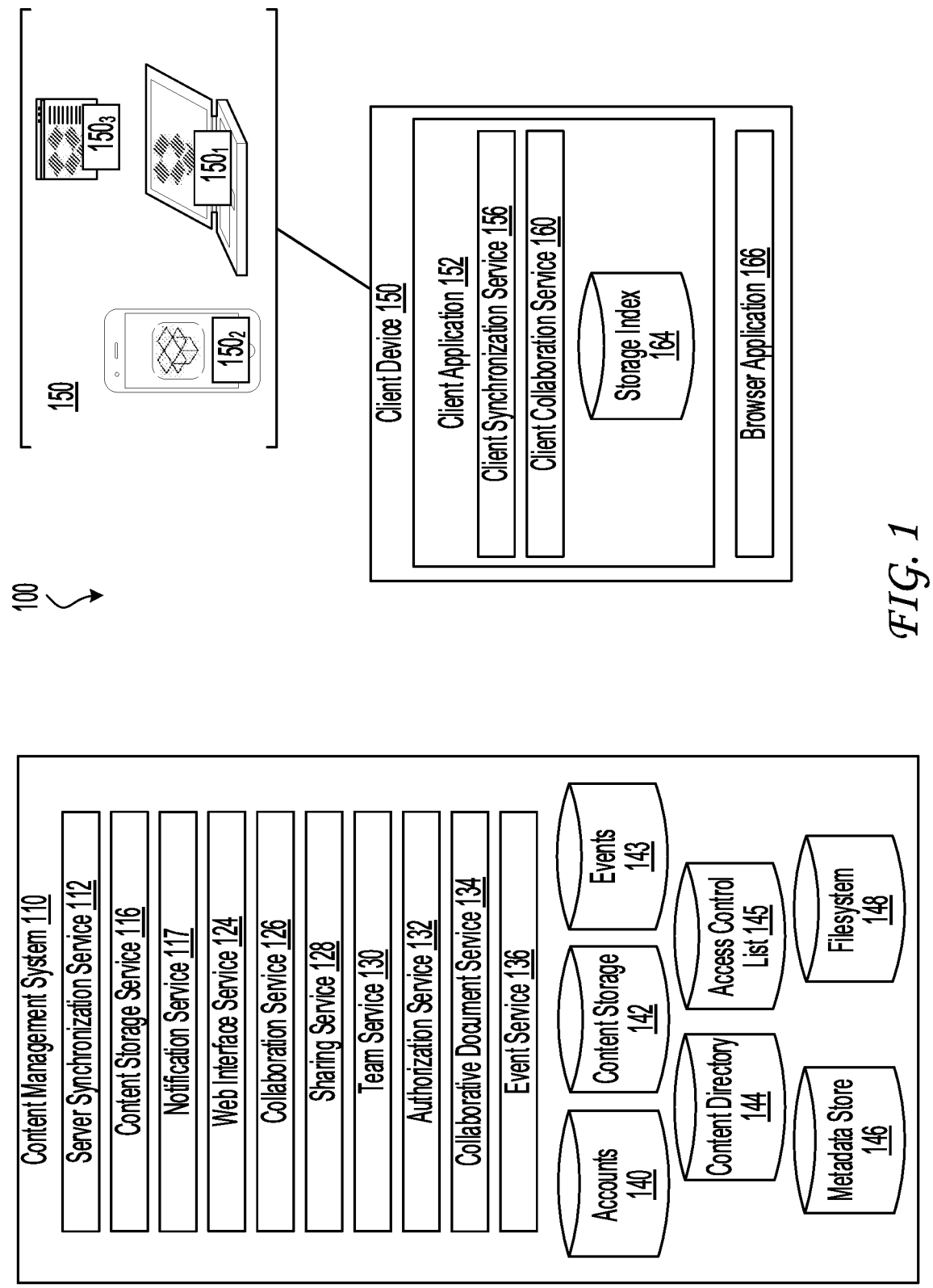
FIG. 1 shows an example configuration of a computing environment including a content management system and client devices, in accordance with some examples.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

As previously noted, users frequently maintain different content across a variety of storage systems, networks, and platforms. The lacking uniformity of storage schemes and centralization of user content has created an explosion of content items that are increasingly scattered across different, and often incompatible, storage systems and devices. The scattered nature of a user's content can significantly hamper the user's ability to organize the content, gain uniform or complete access to the content and associated functionalities from a single online storage system, and collaborate with other users. Moreover, the widespread distribution of different content across disparate systems can often result in content silos that are extremely difficult to manage. These issues can quickly escalate as users distribute an increasing amount of content across disparate systems and attempt to collaborate with other users who may also use disparate systems for storing and accessing their content.

The technologies herein can provide seamless, integrated, and efficient solutions that address or overcome the foregoing and other technical problems and limitations. For example, the technologies herein can provide a migration tool that allows users to easily migrate (e.g., copy, move, upload, etc.) content items from a storage network or system to a single online content management system. The online content management system can allow users to store content items in a centralized location while maintaining synchronized copies of the content items across multiple devices, which they can use to access such copies locally. In many cases, the content items stored on the online content management system can be shared with multiple users, edited, deleted, added, renamed, moved and/or otherwise accessed or manipulated. The content items may include, but are not limited to, files, documents, messages (e.g., email messages or text messages), media files (e.g., photos, videos, and audio files), folders, or any other data or unit of content.

The migration tool can include a user interface (UI) that can allow a user to select content items such as files, folders, and directories, to migrate such content items from a current storage network or system to the online content management system. The migration tool can then automatically migrate the selected content items to the online content management system, while retaining their associated folder hierarchies and directory structures. In some examples, the migration tool can implement an API to migrate the selected content items to the online content management system. In other examples, the migration tool can implement a network communication protocol, such as SMB (Server Message Block) or Samba, to migrate the selected content items to the online content management system.

When migrating the content items, the migration tool can also migrate the permissions set for those content items at the source location (e.g., file server) so the permissions set on the online content management system for those content items are consistent with those set at the source location. In some cases, if the permissions or policy constructs/schemes implemented at the source location differ from, or are incompatible with, those implemented at the online content management system, the migration tool can perform a translation to ensure access privileges at the online storage system match those at the source location. Moreover, the migration tool can also provide a log or CSV (comma-separated values) file with details about the migration. If an error or interruption occurs during the migration, the log or CSV file can be used to recover from the interruption and/or complete the interrupted migration from the point of failure.

In some aspects, the disclosed technologies are deployed in the context of a content management system, such as a cloud storage service, having content item synchronization capabilities and collaboration features, among others. An example configuration 100 of a content management system and environment is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account store 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a browser application 166, such as a web browser. For example, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account store 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change a request changes listed in filesystem 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some embodiments, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While configuration 100 is presented with specific components, it should be understood by one skilled in the art, that the architectural configuration of system 100 is simply one possible configuration and that other configurations with more or fewer components are possible.

Figure 2:
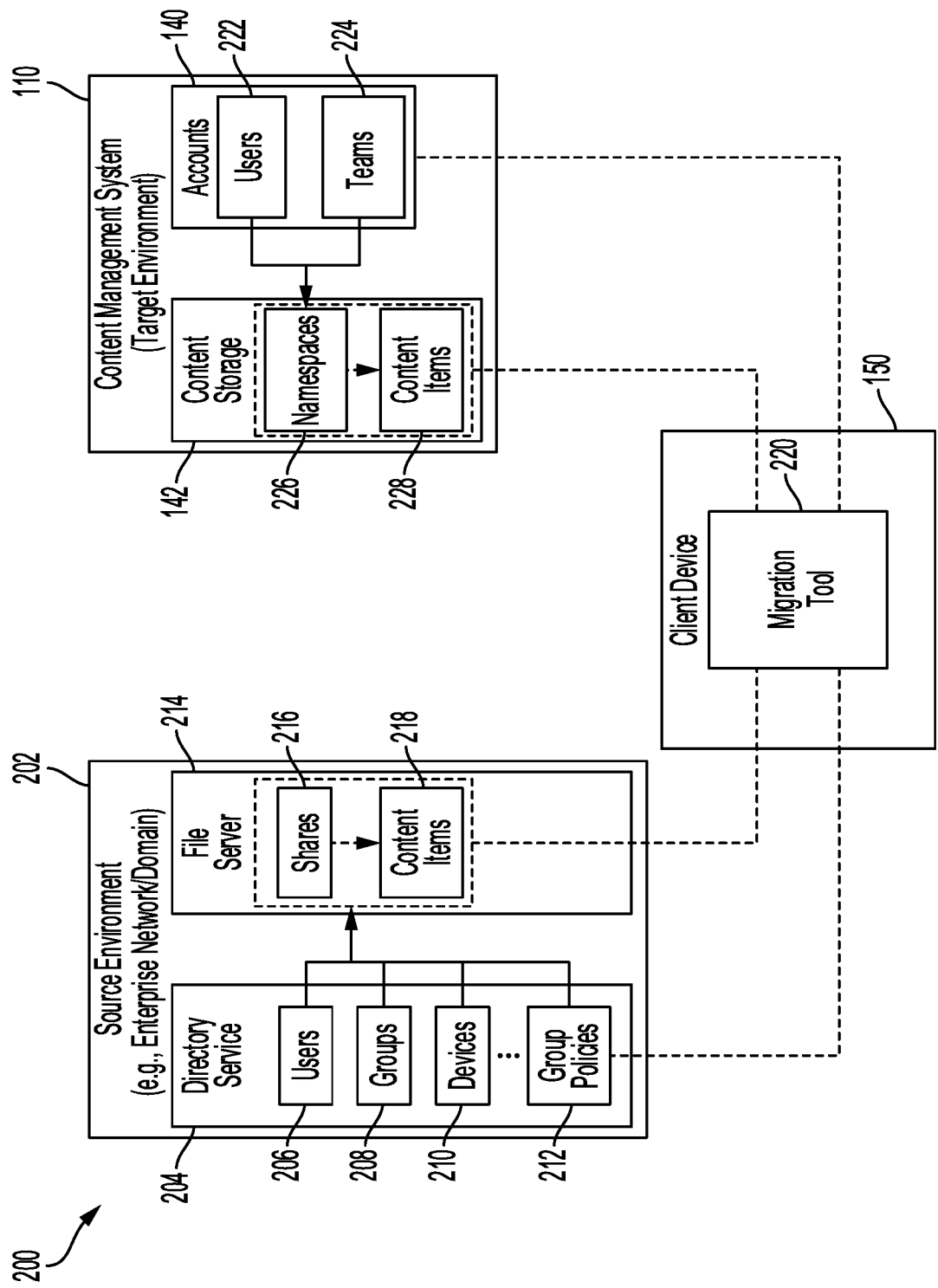
FIG. 2 shows an example environment for migrating shares and content items from a source environment to a content management system, in accordance with some examples.

FIG. 2 shows an example environment 200 for migrating shares 216 and content items 218 from source environment 202 to content management system 110. Example environment 200 can include, without limitation, source environment 202, migration tool 220, and content management system 110.

Source environment 202 can include, for example and without limitation, an enterprise network or domain, an on-premises datacenter, a local area network (LAN), an organization's network, etc. Source environment 202 can be separate from, and/or external to, content management system 110. For example, source environment 202 can be an entirely different network/domain that is remote to content management system 110 and owned/managed by a separate entity, such as a private or third party.

Source environment 202 can include directory service 204. Directory service 204 can provide and maintain directory information for source environment 202 and/or a domain associated with source environment 202. The directory information can include objects and policies associated with source environment 202. For example, the directory information can include users 206 (e.g., user accounts), groups 208 (e.g., user account groups), devices 210 (e.g., device objects and attributes), and group policies 212 (e.g., rules that govern other objects such as users 206, groups 208, devices 210, etc.).

In some examples, directory service 204 can be implemented by one or more directory servers hosted in source environment 202. For example, directory service 204 can be hosted by one or more domain controllers which maintain synchronized copies of the directory information and can perform various tasks such as, for example, authentication, enforcement of security and policies (e.g., permissions, rules, group policies, etc.), directory information replication, management of directory objects (e.g., users, groups, devices, etc.), and so forth. In some cases, directory service 204 can utilize a specific directory services protocol, such as LDAP (Lightweight Directory Access Protocol), for accessing and managing distributed directory information and services.

In some examples, directory service 204 can be configured according to a particular directory scheme, which can define a data model for the directory information and rules associated with the data model and/or constructs associated with the data model. The scheme can define, for example and without limitation, object classes (e.g., users, groups, devices, group policies, etc.), attribute types (e.g., object identifiers, names, etc.), distinguished names (e.g., unique identifiers of entries), rules, structures, syntaxes, etc.

Source environment 202 can also include file server 214. File server 214 can include shares 216 containing content items 218 served on the network and accessible to users 206, groups 208 and/or devices 210 configured in directory service 204. A share (e.g., 216) can refer to a shared folder, shared directory, shared volume or shared storage container hosted by a server (e.g., file server 214) and/or storage device on a network (e.g., 202), that can be accessed by a user account (e.g., 206) from a computing device (e.g., client device 150) using one or more network protocols such as SMB, samba, secure shell, file transfer protocol, and/or any other network file sharing or access protocol.

In some examples, source environment 202 can include a single file server. In other examples, source environment 202 can include multiple file servers. Enforcement of security, authentication, access permissions and policies, and other settings of shares 216 and content items 218 on file server 214 can be governed and implemented by directory service 204 based on users 206, groups 208, devices 210, group policies 212, etc. For example, access permissions and/or group policies 212 of shares 216 and content items 218 can be defined for specific user accounts from users 206, group accounts from groups 208, computing devices from devices 210, etc., in order to control and manage what user accounts and/or devices may access shares 216 and content items, and how much access they are entitled to.

In some cases, share permissions for specific shares 216 and content items 218, such as full control permissions, change permissions, and read permissions, can be defined for specific users 206, groups 208, and/or devices 210 in directory service 204. Such share permissions can define the level of access of users 206, groups 208, and devices 210 to the specific shares 216 and content items 218. In some cases, the level of access of users 206, groups 208, and devices 210 to shares 216 and content items 218 can be based on a combination of share permissions and file system permissions (e.g., NTFS permissions, etc.), such as, for example, full control permissions, modify permissions, read and execute permissions, write permissions, and read permissions.

In some examples implementing a combination of share and file system permissions, the actual level of access of users 206, groups 208, and devices 210 to a particular share or content item can be based on the most restrictive permissions from the share and file system permissions associated with that particular share or content item. For example, the actual level of access of a user account or group having full control share permissions to a share and read-only file system permissions for that share can be read-only access based on the more restrictive read-only file system permission.

Shares 216 and content items 218 on file server 214 can be accessed from computing devices (e.g., laptops, desktops, servers, printers, etc.), such as client device 150, over one or more networks associated with source environment 202. In some examples, shares 216 and content items 218 can be accessed over the network using one or more network protocols such as, for example and without limitation, SMB, samba, SSH (secure shell), FTP (file transfer protocol), and/or any other network file sharing or access protocol.

Migration tool 220 can be an application or software tool configured to enable users to migrate (e.g., copy, upload, etc.) any content (e.g., shares 216, content items 218) and associated permissions on source environment 202 (e.g., on file server 214) to content management system 110. For example, migration tool 220 can migrate shares 216 (or any portion thereof) and/or content items 218 (or any portion thereof) from file server 214 on source environment 202 to content storage 142 on content management system 110. As used herein, the term "migrate" can include copying, moving, or uploading one or more items (e.g., shares 216, content items 218, etc.) from a source location (e.g., source environment 202) to a target location (e.g., content management system 110) with or without retaining/keeping the one or more items (or a copy thereof) at the source location.

When migrating content (e.g., shares 216 and/or content items 218) from file server 214 to content storage 142 on content management system 110, migration tool 220 can copy or upload the content to content storage 142 on content management system 110. In some examples, migration tool 220 can also migrate (e.g., copy, upload, map) the permissions set on source environment 202 (e.g., the permissions set in directory service 204 and/or file server 214) for the content being migrated to content management system 110, such that the migrated content on content management system 110 retains the permissions set for the content in source environment 202.

For example, when migrating shares 216 (or any other content) from source environment 202 to content management system 110, migration tool 220 can determine the permissions set in source environment 202 for shares 216 and configure those permissions (or an equivalent set of permissions) for shares 216 on content management system 110. In some cases, the permissions can include the accounts (e.g., user accounts 206, groups 208, devices 210) having access to shares 216 (and any accounts having access to shares 216 denied) and their respective level of access. In some cases, the permissions can also (or alternatively) include filesystem permissions (e.g., NTFS permissions) set for shares 216 on file server 214 and/or permissions set for shares 216 via group policies 212.

To migrate the permissions, migration tool 220 can map users 206 and/or groups 208 on source environment 202 having access to shares 216 to users 222 and/or teams 224 on accounts store 140 of content management system 110 that correspond to users 206 and/or groups 208 on source environment 202. Migration tool 220 can also configure users 222 and/or teams 224 on accounts store 140 of content management system 110 to have the same level of access to the migrated content (e.g., shares 216) as the level of access set for corresponding accounts from users 206 and/or groups 208 on source environment 202. Thus, users and groups having access to shares 216 on source environment 202 can have the same access to the migrated shares on content management system 110.

In some examples, migration tool 220 can map any groups (208) in directory service 204 that have access permissions set for the content being migrated (e.g., shares 216 and/or content items 218) to corresponding teams (224) in accounts store 140 on content management system 110. Migration tool 220 can determine the level of access configured for those groups (208) in directory service 204 with access permissions set for the content being migrated, and apply or configure the same level of access for the corresponding teams (224) in accounts store 140 on content management system 110 so the teams in content management system 110 have the same access as the groups in source environment 202.

In some cases, the types of access permissions or permission constructs implemented in source environment 202 may differ from those in content management system 110. For example, source environment 202 may implement full control permissions which allow users to add, edit, or delete content; read permissions which provide users view-only access to content; and write permissions which allow users to make changes to content. On the other hand, content management system 110 may implement owner roles which allow users to make changes to content and control the sharing policies, ownership, and membership of content; editor roles which allow users to add, edit, or delete content; editor roles with member management settings which allow users to add, edit, or delete content and manage user membership to that content; traverser roles which allow users to see and navigate into content items from a parent content item (e.g., a folder, directory, etc.) if the users are configured as traversers on the parent content item; and viewer roles which allow users to view content, comment on content, and traverse content.

In such examples where the types of access permissions or permission constructs implemented in source environment 202 differ from those in content management system 110, migration tool 220 can translate the access permissions and/or permission constructs from source environment 202 to specific access permissions and/or permission constructs implemented by content management system 110. In some examples, migration tool 220 can determine the amount or type of access (e.g., what type of operations or interactions a user can perform on a given content item) provided by specific permissions and/or permission constructs in source environment 202, and identify which access permissions and/or permission constructs in content management system 110 can provide the amount or type of access to content provided by the specific permissions and/or permission constructs in source environment 202. Migration tool 220 can then configure the corresponding access permissions and/or permission constructs in content management system 110 for specific users 222 or teams 224 in content management system 110.

In some cases, if content management system 110 implements a particular access permission or construct that is not implemented in source environment 202, migration tool 220 can determine whether to apply or ignore that particular access permission or construct when migrating content to content management system 110. Migration tool 220 can make such determination based on a user input (e.g., an input from a user having ownership of an associated content item), one or more factors (e.g., type of access provided by the particular access permission or construct, etc.), one or more rules, etc. For example, when migrating a content item, migration tool 220 can handle an access permission available at content management system 110 that is not available at source environment 202 by applying to the migrated content the most analogous set of permissions at source environment 202 and/or the most restrictive access permissions available at content management system 110 that would provide the same level of access to the migrated content item as that set at source environment 202 as well as (or excluding) the level of access provided by the access permission available at content management system 110 that is not available at source environment 202.

To illustrate, if content management system 110 implements commenting permissions that grant users the ability to comment on a content item but source environment 202 does not implement such permissions, migration tool 220 can identify the most analogous access permissions (e.g., read or write) implemented at source environment 202 and grant the commenting permissions to users (222) or teams (224) in content management system 110 only if those users or teams have the most analogous access permissions configured in source environment 202 for that content item. In other examples, migration tool 220 can configure, for a migrated content item, specific access permissions that are implemented by content management system 110 and are not implemented by source environment 202 if those specific access permissions do not conflict with the access permissions configured for that content item in source environment 202 and/or any access restrictions provided by such access permissions in source environment 202.

In some cases, when migrating shares 216 and/or content items 218 from source environment 202 to content management system 110, migration tool 220 can also migrate (e.g., copy, upload, map) the structure or hierarchy (e.g., a directory structure, folder hierarchies, etc.) of shares 216 and/or content items 218 on file server 214 to content storage 142 on content management system 110, such that the migrated shares and/or content items on content management system 110 retain the structure or hierarchy from source environment 202.

For example, assume shares 216 includes a share called "Forms" and the "Forms" share includes a folder A and a folder B inside of folder A. In this example, when migrating the "Forms" share to content management system 110, migration tool 220 can create a "Forms" namespace (226) or share on content management system 110 (e.g., in content storage 142) that includes folder A and also includes folder B inside of folder A. Thus, the migrated "Forms" namespace or share on content management system 110 can retain the directory structure or folder hierarchies from the "Forms" share in source environment 202.

In some cases, migration tool 220 can suggest a directory structure or folder hierarchy for the migrated content and provide the user an opportunity to keep or change the suggested directory structure or folder hierarchy. If the user modifies the directory structure or folder hierarchy, migration tool 220 can recalculate access permissions to take into account any permissions inherited by child content items from parent content items or otherwise modified (or potentially modified) by the change in directory structure or folder hierarchy.

Moreover, as previously described, content management system 110 can include account store 140 containing users 222 and teams 224 configured in content management system 110. Users 222 can refer to user accounts registered at content management system 110, and teams 224 can be teams or groups of user accounts configured at content management system 110. Also, content management system 110 can include namespaces 226 containing content items 228 stored in content storage 142. Namespaces 226 can serve as containers for content items 228 and any other objects.

Moreover, namespaces 226 can be used to organize content items 228 and any other objects. For example, the content items for a user can be organized into a namespace that serves as a container and/or storage structure for the content items of that user, and a shared directory or folder can be organized into a shared namespace that serves as a container and/or storage structure for the content items in that shared directory or folder. In some examples, each namespace can have a unique name or identifier, which can uniquely identify that namespace within content management system 110. In some cases, each namespace can be a logical container which can be hosted by a single storage device and/or server, or can span multiple storage devices and/or servers.

In some cases, when creating a share being migrated from source environment 202, migration tool 220 can create a namespace for that share in content management system 110, and use that namespace to store the content items from the migrated share. The created namespace can represent the root or top level of the migrated share. Moreover, migration tool 220 can configure that namespace to include the same directory structure or folder hierarchies as the migrated share. Migration tool 220 can also migrate permissions from the migrated share and apply such permissions to the namespace, as previously explained.

In other cases, when creating a share being migrated from source environment 202, migration tool 220 can create, for the migrated share in content management system 110, a namespace within a namespace, a folder/directory within a folder/directory in a namespace, or a folder/directory within a namespace. Migration tool 220 can use that namespace or folder/directory created for the share to store the content items from the migrated share. The created namespace or folder/directory can represent the root or top level of the migrated share. Moreover, migration tool 220 can configure that namespace or folder/directory to include the same directory structure or folder hierarchies as the migrated share. Migration tool 220 can also migrate permissions from the migrated share and apply such permissions to the namespace or folder/directory.

In some cases, instead of migrating an entire share to content management system 110, migration tool 220 can migrate individual content items within the share and/or collections of content items within the share. In such examples, migration tool 220 can store the migrated content items and/or collections of content items on a namespace or folder/directory created for them. Migration tool 220 can also migrate permissions and/or directory structure or folder hierarchies, as previously explained.

In some cases, migration tool 220 can be implemented by, and/or run on, client device 150. Moreover, client device 150 can reside in source environment 202 or a separate network or network environment. In some examples, when residing in source environment 202, client device 150 can access and retrieve shares 216 and content items 218 on file server 214 from the network of source environment 202, and migrate any portions of shares 216 and/or content items 218 to content management system 110 through the network of source environment 202 and migration tool 220.

In other examples, when residing in a network or network environment external to source environment 202, client device 150 can access or retrieve shares 216 and content items 218 from source environment 202, and migrate any portions of shares 216 and/or content items 218 to content management system 110 through migration tool 220 and the network or network environment external to source environment 202. In some cases, client device 150 and migration tool 220 can access, retrieve, and/or migrate any portions of shares 216 and/or content items 218 using one or more network protocols such as, for example and without limitation, SMB, samba, SSH, FTP, HTTP (HyperText Transfer Protocol), HTTPS (HyperText Transfer Protocol Secure), and/or any other network file sharing, access or transfer protocol.

Figure 3:
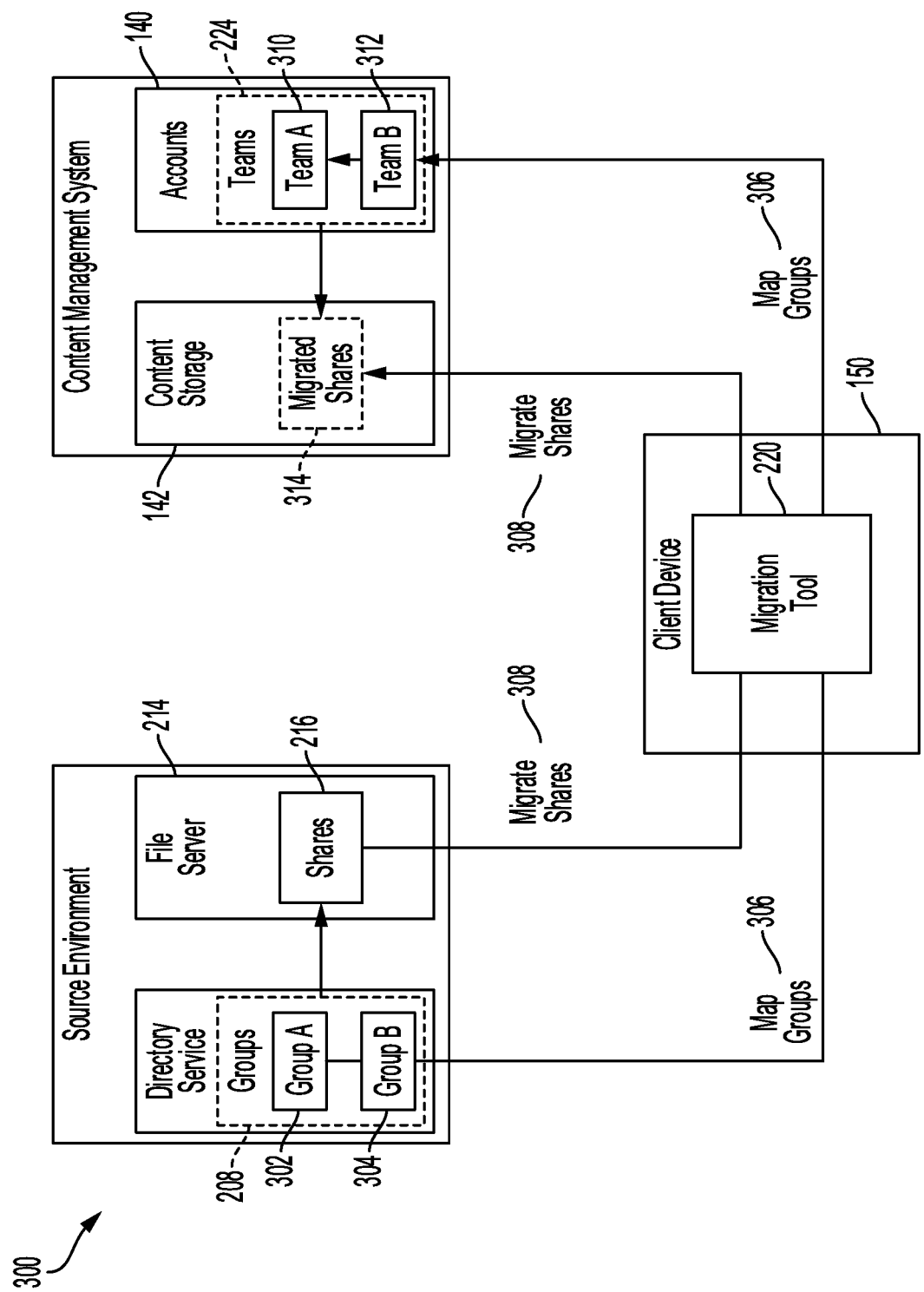
FIG. 3 shows an example migration of shares from a source environment to a content management system, in accordance with some examples.

FIG. 3 shows an example migration 300 of shares 216 from source environment 202 to content management system 110. To migrate shares 216 and the access permissions set in source environment 202 for shares 216, migration tool 220 can determine which groups 208 in source environment 202 have access to shares 216 and what level of access (e.g., what access permissions) they have. Migration tool 220 can then map 306 those groups 208 in source environment 202 to specific teams 224 in content management system 110 and configure those specific teams 224 to have the same or equivalent level of access to the migrated shares on content management system 110 as those groups 208 in source environment 202 have to shares 216.

In this example, groups 302 and 304 from groups 208 in directory service 204 have access permissions set for shares 216 in source environment 202. Thus, migration tool 220 can map 306 groups 302 and 304 from source environment 202 to teams 310 and 312 in content management system 110. Teams 310 and 312 can correspond to and/or represent groups 302 and 304. Moreover, teams 310 and 312 in content management system 110 can include specific user accounts (222) in content management system 110 that correspond to (e.g., are owned by, associated with, or assigned to) specific user accounts (206) in groups 302 and 304.

Migration tool 220 can migrate 308 shares 216 from source environment 202 to content management system 110 and configure teams 310 and 312 with specific access permissions to migrated shares 314 in content management system 110. The specific access permissions to migrated shares 314 configured for teams 310 and 312 can be based on the access permissions configured on shares 216 for groups 302 and 304 in source environment 202. For example, teams 310 and 312 in content management system 110 can each be configured to have a level of access to migrated shares 314 that is the same or equivalent to the level of access that groups 302 and 304 have to shares 216 in source environment 202.

When migrating 308 shares 216 from source environment 202 to content management system 110, migration tool 220 can create migrated shares 314 on content management system 110 based on shares 216 in source environment 202. In some examples, migration tool 220 can create migrated shares 314 with the same or mirrored structure (e.g., directory structure, folder hierarchies, etc.) as shares 216. Moreover, migration tool 220 can upload or copy the content items in shares 216 to migrated shares 314 in content management system 110. Migration tool 220 can also configure teams 310 and 312 to have the same or equivalent access permissions to migrated shares 314 and the content items in migrated shares 313 as the access permissions configured for groups 302 and 304 to shares 216 and the content items in shares 216. Thus, migrated shares 314 can not only include the content items in shares 216, but can also mirror the structure and access permissions of shares 216 in source environment 202.

In some cases, migration tool 220 can also configure other settings for migrated shares 314 (and/or one or more content items in migrated shares 314) on content management system 110. For example, migration tool 220 can configure migrated shares 314 (and/or one or more content items in migrated shares 314) to include specific synchronization settings, seen state settings (e.g., settings allowing a user account to see what other user accounts have accessed or interacted with specific content items), presence settings (e.g., settings allowing a user account to see what other user accounts are viewing or interacting with specific content items), backup and/or restore settings, history accessibility settings (e.g., settings allowing a user account to see a history of operations or states for specific content items), additional access permissions, and/or any other settings.

In some examples, migration tool 220 can configure selective synchronization settings for migrated shares 314 and/or one or more content items in migrated shares 314. The selective synchronization settings can allow a user to define whether specific content items associated with the user's account should be synchronized to one or more client devices associated with the user's account. Thus, the selective synchronization settings can allow a user to define whether migrated shares 314 and/or specific content items in migrated shares 314 should be synchronized to one or more client devices associated with the user's account. For example, if a selective synchronization setting is enabled in user account A for content item A in migrated shares 314, content management system 110 can create a local version of content item A on one or more client devices associated with user account A and maintain such local version synchronized with content item A on content management system 110.

On the other hand, if the selective synchronization setting is not enabled for content item A in user account A, content management system 110 can create a placeholder for content item A on one or more client devices associated with user account A. The placeholder can represent content item A but may not include the actual data contents of content item A. This way, the user associated with user account A can see a representation of content item A (e.g., the placeholder) from the one or more client devices and know that content item A is available and exists at content management system 110, while also saving storage space on the one or more client devices by not storing the actual data contents of content item A on the one or more client devices. In some examples, the data contents of content item A can be accessed from content item A on content management system 110 through the placeholder on the one or more client devices. Thus, the placeholder can enable access to content item A on content management system 110 without storing its actual data contents.

In some cases, instead of mirroring the structure of shares 216 on migrated shares 314, migration tool 220 can suggest the structure of shares 216 as the structure for migrated shares 314 and allow the user to accept the suggestion or make changes to the structure of migrated shares 314. If the user changes the structure for migrated shares 314, migration tool 220 can create migrated shares 314 on content management system 110 based on the changed structure. Migration tool 220 can also calculate and reconcile any changes in the access permissions or settings of migrated shares 314 caused by the change in structure. For example, if the user indicates that folder A should be moved from inside of folder B to instead be stored inside of folder C, migration tool 220 can determine whether access permissions and/or settings for folder A could be affected by changing its parent folder from folder B to folder C.

To illustrate, if folder C has a different set of access permissions than folder B, then such move could potentially alter the access permissions for folder A. For example, folder A may inherit certain access permissions from folder C that would not have been inherited from folder B and/or folder C may not have access permissions, such as traversal permissions, set for certain user accounts, which may prevent such user accounts from accessing or navigating to folder A through folder C (or at all). To reconcile potential issues that can be created by such a change in structure or folder hierarchies, migration tool 220 can determine whether such a change would impact the access permissions and/or settings of folder A. If migration tool 220 determines that such a change would impact access permissions and/or settings of folder A, migration tool 220 can determine whether to allow/leave any such changes in the access permission and/or settings of folder A or change the access permissions and/or settings of folder A (and/or any parent content item) so the access permissions and/or settings of folder A remain the same as if folder A had not been moved from folder B to folder C.

FIG. 4 shows example access control list 400 configured at content management system 110 for folders created at content management system 110 based on shares (e.g., 216) migrated from source environment 202. In some examples, access control list 400 can record entities having access to namespaces/folders during a migration (e.g., 300) of content items or shares from source environment 202.

As illustrated, access control list 400 can define access permissions of specific user accounts (e.g., 222) and/or teams (e.g., 224) to specific namespaces and/or content items (e.g., folders, files, directories, etc.) in content management system 110. For example, access control list 400 can include entry 404 for a marketing folder migrated from source environment 202. Entry 404 can identify a marketing team from teams 224 in content management system 110 as having write access to the marketing folder. Entry 404 can define such access permission for the marketing team without individually listing each member of the marketing team. In some examples, the marketing team can correspond to a group from groups 208 in source environment 202 that has write access to a copy of the marketing folder stored in source environment 202. In some examples, the marketing team can include a set of user accounts (e.g., 222) from content management system 110 corresponding to a set of user accounts (e.g., 206) from source environment 202 having write access to a copy of the marketing folder stored in source environment 202.

Moreover, access control list 400 can include entry 406 for folder A. Entry 406 can identify the marketing team as having write access to folder A and member 1 as having read access to folder A. Folder A can be a folder migrated from source environment 202, and member 1 can represent a user account in content management system 110 that corresponds to a user account in source environment 202 that has read access to a copy of folder A stored in source environment 202.

Access control list 400 can also include entry 408 for an engineering folder migrated from source environment 202, and entry 410 for a product folder migrated from source environment 202. Entry 408 can identify an engineering team from teams 224 in content management system 110 as having write access to the engineering folder, and entry 410 can identify a product team from teams 224 in content management system 110 as having write access to the product folder. Entries 408 and 410 can define such access s for the engineering and product teams respectively, without individually listing each member of each team. In some examples, the engineering team can correspond to a group from groups 208 in source environment 202 that has write access to a copy of the engineering folder stored in source environment 202, and the product team can correspond to a group from groups 208 in source environment 202 that has write access to a copy of the product folder stored in source environment 202.

Moreover, in some examples, the engineering team can include a set of user accounts (e.g., 222) from content management system 110 corresponding to a set of user accounts (e.g., 206) from source environment 202 having write access to a copy of the engineering folder stored in source environment 202. Similarly, in some examples, the product team can include a set of user accounts (e.g., 222) from content management system 110 corresponding to a set of user accounts (e.g., 206) from source environment 202 having write access to a copy of the product folder stored in source environment 202.

Access control list 400 can also include entry 406 for folder A. Entry 406 can identify the marketing team as having write access to Folder A and member 1 as having read access to Folder A. Folder A can be a folder migrated from source environment 202, and Member 1 can represent a user account in content management system 110 that corresponds to a user account in source environment 202 that has read access to a copy of Folder A stored in source environment 202.

In some cases, access control list 400 can illustrate when a folder or directory is its own namespace or when it is nested within another namespace. For example, in access control list 400, the marketing folder, the engineering folder, and the product folder are depicted as being their own namespaces, while Folder A is depicted as a folder nested within a namespace. Moreover, as illustrated in FIG. 4, each shared folder has a unique namespace identifier (ns_id) corresponding to that folder. For example, the marketing folder in entry 404 has an ns_id=2, the engineering folder in entry 408 has an ns_id=3, and the product folder in entry 410 has an ns_id=5.

Each shared folder in content management system 110 can have its own set of access permissions. Therefore, each shared folder can be configured as a namespace and/or nested within a namespace. Namespaces can be used to organize content items and define a new access model from a parent or root folder. As previously described, the marketing, engineering, and product folders can be considered respective namespaces while Folder A may not be considered a namespace as it is nested within ns_id 2 (the marketing folder's namespace) and shares some of the access permissions from its parent, the marketing folder or namespace.

In some cases, user account folders can also appear in access control list 400. For example, entry 402 is for the folder "Member 1", which is the user account folder of Member 1 and has its access restricted to Member 1. As shown in entry 402, Member 1 is the owner of the Member 1 folder and has owner permissions to that folder.

Access control list 400 illustrates write, read, and owner access permissions granted to specific teams and/or user accounts in content management system 110 for specific namespaces and folders. These access permissions are non-limiting examples provided for explanation purposes. Some implementations may include other or different access permissions than those shown in FIG. 4. Other example access permissions can include, for example and without limitation, view-name-only permissions, traversal permissions, manage permissions, etc.

View-name-only permissions can provide a user account and/or team access to view a content item. Such access permissions can allow a user account, such as a user account of Member 1, to view the existence of a content item associated with that access permission, but may prevent that user account from opening the content item and therefore preventing the user account from reading or modifying the contents of that content item.

Traversal permissions can provide a user account and/or team permission to open a folder or namespace solely for the purpose of traversing through that folder or namespace to access a different content item nested within that folder or namespace, to which that user account and/or team has explicit access.

Manage permissions can grant a user account and/or team permission to manage the memberships of a content item. In some cases, manage permissions can allow a user account and/or team to manage a content and policy of the content item associated with that manage permission.

Owner permissions can grant a user account or team full control over a content item. For example, owner permissions can grant read, write, manage, traversal, and any other type of access.

Figure 5:
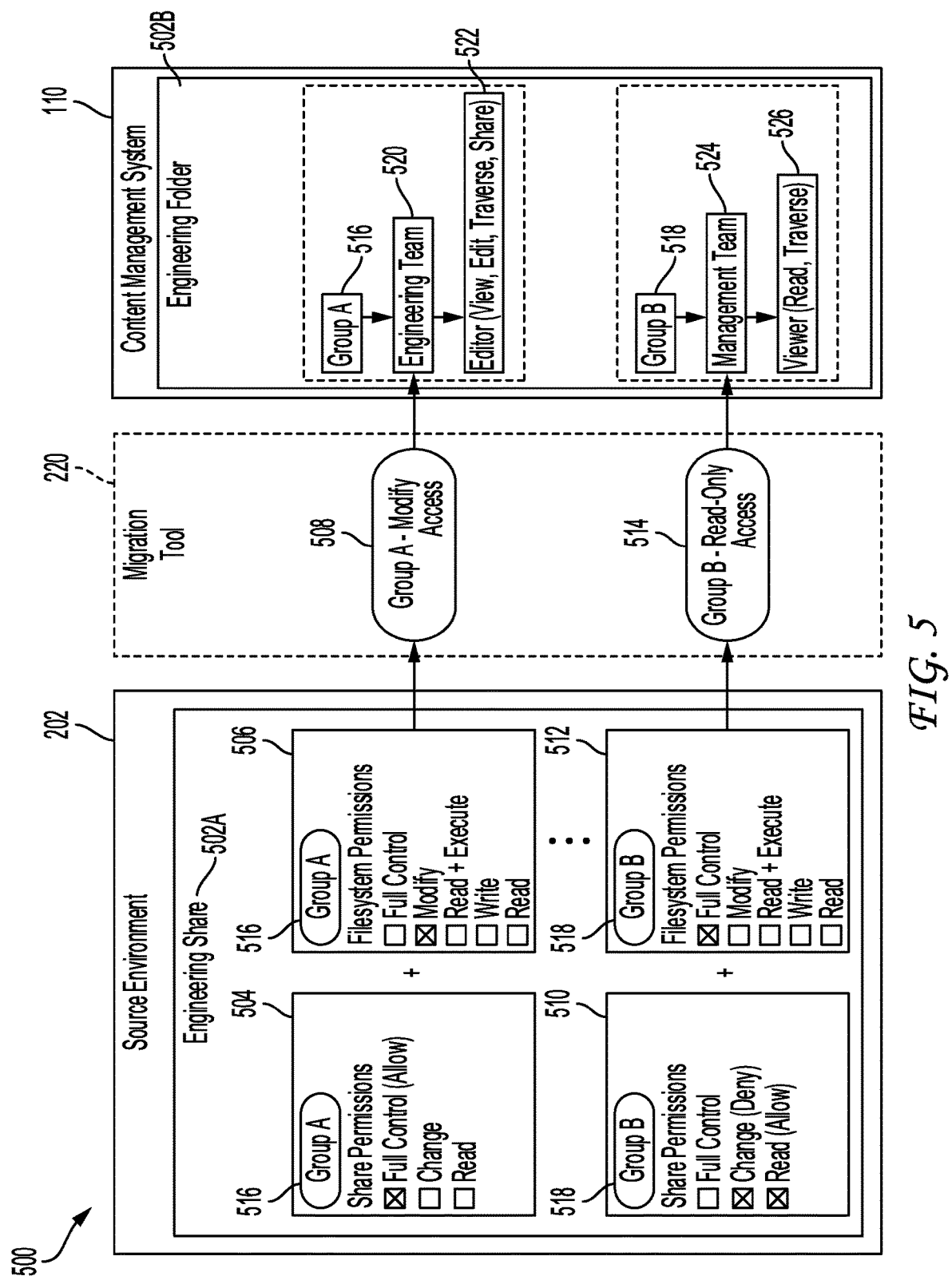
FIG. 5 is a diagram showing an example use case for translating and mapping access permissions from a source environment to a content management system, in accordance with some examples.

FIG. 5 is a diagram showing example use case 500 for translating and mapping access permissions from source environment 202 to content management system 110. In this example, source environment 202 is shown implementing different permissioning schemes or constructs for engineering share 502A. The different permissioning schemes or constructs can be analyzed to calculate actual access levels afforded to engineering share 502A by the different permissioning schemes or constructs. The actual access levels calculated can be translated or mapped to access permissions in content management system 110 and migrated to content management system 110 as part of a migration of engineering share 502A.

The different permissioning schemes or constructs in example use case 500 include share permissions and filesystem permissions (e.g., NTFS permissions, etc.). As shown, Group A (516) in source environment 202 has full control share permissions 504 defined for engineering share 502A, granting Group A (516) full control to engineering share 502A. In addition, Group A (516) has modify filesystem permissions 506 defined for engineering share 502A, granting Group A (516) modify access to engineering share 502A.

Moreover, Group B (518) in source environment 202 has share permissions 510 defined for engineering share 502A granting Group B (518) read permissions and denying change permissions to engineering share 502A. In addition, Group B (518) has full control filesystem permissions 512 defined for engineering share 502A, granting Group B (518) full control access to engineering share 502A.

Since share permissions 504 differ from filesystem permissions 506, migration tool 220 can implement one or more rules or strategies for resolving any conflicts or differences between share permissions 504 and filesystem permissions 506, to determine actual access privileges 508 for Group A (516). In some examples, migration tool 220 can resolve such conflicts or differences based on the most restrictive or most permissive permissions between share permissions 504 and filesystem permissions 506.

For example, in use case 500, actual access privileges 508 for Group A (516) are calculated based on the most restrictive permissions from share permissions 504 and filesystem permissions 506. Thus, since the modify access in filesystem permissions 506 is more restrictive than the full control access in share permissions 504, migration tool 220 can determine that actual access privileges 508 should provide modify access. Migration tool 220 can then translate or map actual access privileges 508 to one or more specific access permissions to implement at content management system 110 for engineering folder 502B at content management system 110.

Similarly, since share permissions 510 differ from filesystem permissions 512, migration tool 220 can implement one or more rules or strategies for resolving any conflicts or differences between share permissions 510 and filesystem permissions 512, to determine actual access privileges 514 for Group B (518). In use case 500, actual access privileges 514 for Group B (518) are calculated based on the most restrictive permissions from share permissions 510 and filesystem permissions 512. Thus, since share permissions 510 provide read access and deny change access to Group B (518), which is more restrictive than the full control access in filesystem permissions 512, migration tool 220 can determine that actual access privileges 514 should provide read-only access. Migration tool 220 can then translate or map actual access privileges 514 to one or more specific access permissions to implement at content management system 110 for engineering folder 502B at content management system 110.

When mapping or implementing actual privileges 508 at content management system 110, migration tool 220 can map Group A (516) from source environment 202 to engineering team 520 in content management system 110. Engineering team 520 can include a set of user accounts in content management system 110 that correspond to the user accounts included in Group A (516) at source environment 202. The user accounts in engineering team 520 can include existing accounts that are mapped to, or matched with, the user accounts in Group A (516) and/or new accounts created at content management system 110 based on the user accounts in Group A (516).

Once Group A (516) has been mapped to, or matched with, engineering team 520, migration tool 220 can configure engineering team 520 to have access permissions 522 to engineering folder 502B. Access permissions 522 can be based on actual access privileges 508 calculated for Group A (516). In this example, access permissions 522 include editor permissions, which can provide, for example, view, edit, traverse, and share access privileges. Such editor permissions can be consistent with the modify access provided by actual access privileges 508.

Likewise, when mapping or implementing actual privileges 514 at content management system 110, migration tool 220 can map Group B (518) from source environment 202 to management team 524 in content management system 110. Management team 524 can include a set of user accounts in content management system 110 that correspond to the user accounts included in Group B (518) at source environment 202. The user accounts in management team 524 can include existing accounts that are mapped to, or matched with, the user accounts in Group B (518) and/or new accounts created at content management system 110 based on the user accounts in Group B (518).

Once Group B (518) has been mapped to, or matched with, management team 524, migration tool 220 can configure management team 524 to have access permissions 526 to engineering folder 502B. Access permissions 526 can be based on actual access privileges 514 calculated for Group B (518). In this example, access permissions 526 include viewer permissions, which can provide, for example, read and traverse access privileges. Such viewer permissions can be consistent with the read-only access provided by actual access privileges 514.

Figure 6A:
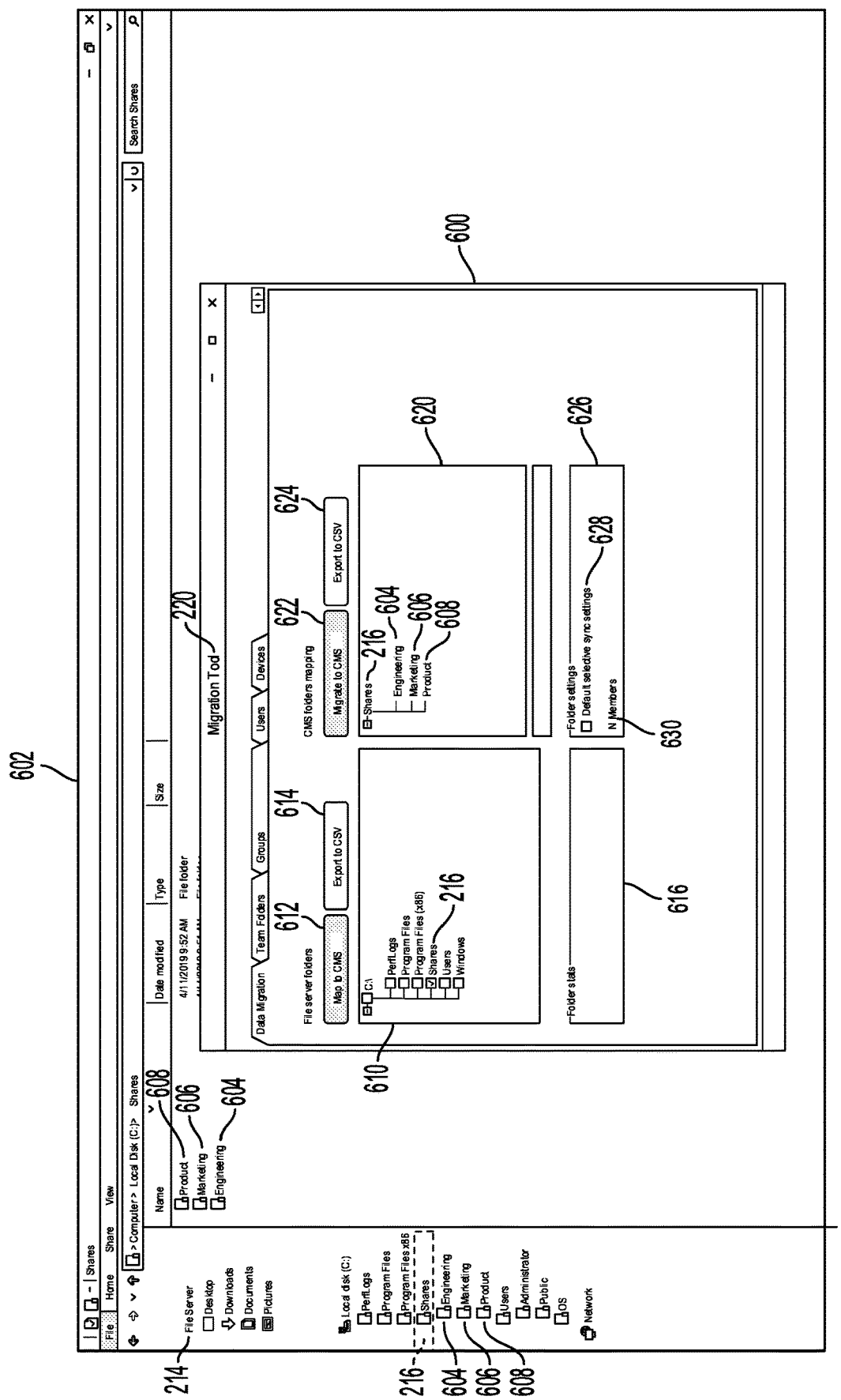
FIGS. 6A through 6C show an example migration tool interface which users can use to migrate content items from a source environment to a content management system, in accordance with some examples.

FIG. 6A shows example migration tool interface 600 which users can use to migrate content items from source environment 202 to content management system 110. Migration tool interface 600 is shown along with file explorer interface 602, which depicts shares 216 stored in file server 214 of source environment 202. As illustrated in file explorer interface 602, shares 216 on file server 214 include engineering share 604, marketing share 606, and product share 608. Users can migrate any selected shares from shares 216 using migration tool interface 600, as described herein.

Migration tool interface 600 includes a migration source section 610 depicting shares 216 from file server 214. Migration tool interface 600 can also depict any other content items on file server 214, which the user can select from when performing a migration. To migrate content items from file server 214 to content management system 110, the user can select any content items in migration source section 610 and select mapping option 612 in migration tool interface 600 to map the selected content items to content management system 110. In this example, the user has selected shares 216 from migration source section 610 for migration. When the user selects mapping option 612, shares 216 selected from migration source section 610 are displayed in migration target section 620.

Migration target section 620 depicts any content items that have been selected for migration to content management system 110. In this example, migration target section 620 depicts engineering share 604, marketing share 606, and product share 608 from shares 216, based on the user's selection of shares 216 in migration source section 610 and mapping option 612. Once the user has mapped all content items to be migrated, which are depicted in migration target section 620 as previously explained, the user can select migration option 622 from migration tool interface 600 to begin the migration process. The migration process can include the migration of shares 216 and associated permissions, as previously explained. In some cases, the migration process can also include migration of metadata associated with shares 216, such as information about the content structure or hierarchies of shares 216, timestamps (e.g., creation dates, modification dates, etc.), content item names or identifiers, properties information, etc.

Migration tool interface 600 can also include export option 614 and export option 624. Export option 614 can provide the user an option to export information such as metadata from migration source section 610. The exported information generated by export option 614 can include information about any content items or settings selected in migration source section 610, such as which content items (e.g., shares 216) have been selected for migration and/or mapped to content management system 110, a directory structure or folder hierarchies associated with the content items that have been selected for migration and/or mapped to content management system 110, statistics, permissions, etc.

The exported information can be exported to a log or file, such as a comma-separated values (CSV) file. In some cases, the exported log or file can be uploaded to content management system 110 and/or migration tool 220 so the information contained in the exported log or file is migrated to content management system 110 and/or used to configure migrated content items, such as shares 216 in this example.

Export option 624 can provide the user an option to export or log information about the migration process, such as migration status or statistics information. In some examples, the exported or logged information created when a user selects export option 624 can include a status/state of the migration process, a progress of the migration process, a snapshot of the migration process, and/or any other statistics about the migration process. For example, the exported or logged information can indicate a time when the migration was initiated, which content items were successfully migrated, which content items have not been or were not successfully migrated, a point where the migration process ended (e.g., a point of completion, a failure point, etc.), any errors or failures encountered during the migration process, etc.

In some examples, the exported or logged information can be used to determine if the migration completed successfully or failed to complete. If the migration failed to complete, the exported or logged information can identify where the migration ended/failed, and can be used to troubleshoot any problems and/or resume migration from a point of failure (e.g., rather than resuming from the beginning and having to redo portions of the migration previously completed). For example, in some cases, the exported or logged information can be inputted or uploaded to migration tool 220 when re-attempting a failed migration to initiate the next attempted migration from a failure point of the previously-attempted migration.

In some cases, export option 624 can export information into a log or file, such as a CSV file, for example. Moreover, the log or file can be stored locally on file server 214 and/or transmitted to content management system 110 for storage. In some cases, the log or file can be uploaded into migration tool 220 or selected for use by migration tool 220 when performing a migration after a failed migration.

In some examples, migration tool interface 600 can include statistics section 616 which can display statistics information about content items selected in migration source section 610 (e.g., shares 216 selected in migration source section 610). The statistics information can include, for example and without limitation, size information, content item type information, timestamps, etc.

Migration tool interface 600 can also include settings section 626, which can display settings associated with the content items selected for migration (e.g., engineering share 604, marketing share 606, and product share 608 from shares 216) and/or allow users to input settings for the content items selected for migration. For example, in some cases, settings section 626 can include selective sync settings option 628, which provides an option for users to configure selective synchronization settings for the content items to be migrated. Migration tool 220 can apply any selective synchronization settings selected or defined in selective sync settings option 628, when migrating content items to content management system 110.

In some cases, settings section 626 can include membership settings 630, which can identify the memberships of the content items in migration target section 620 selected for migration. In some examples, membership settings 630 can allow a user to manually edit the memberships for such content items as desired.

Figure 6B:
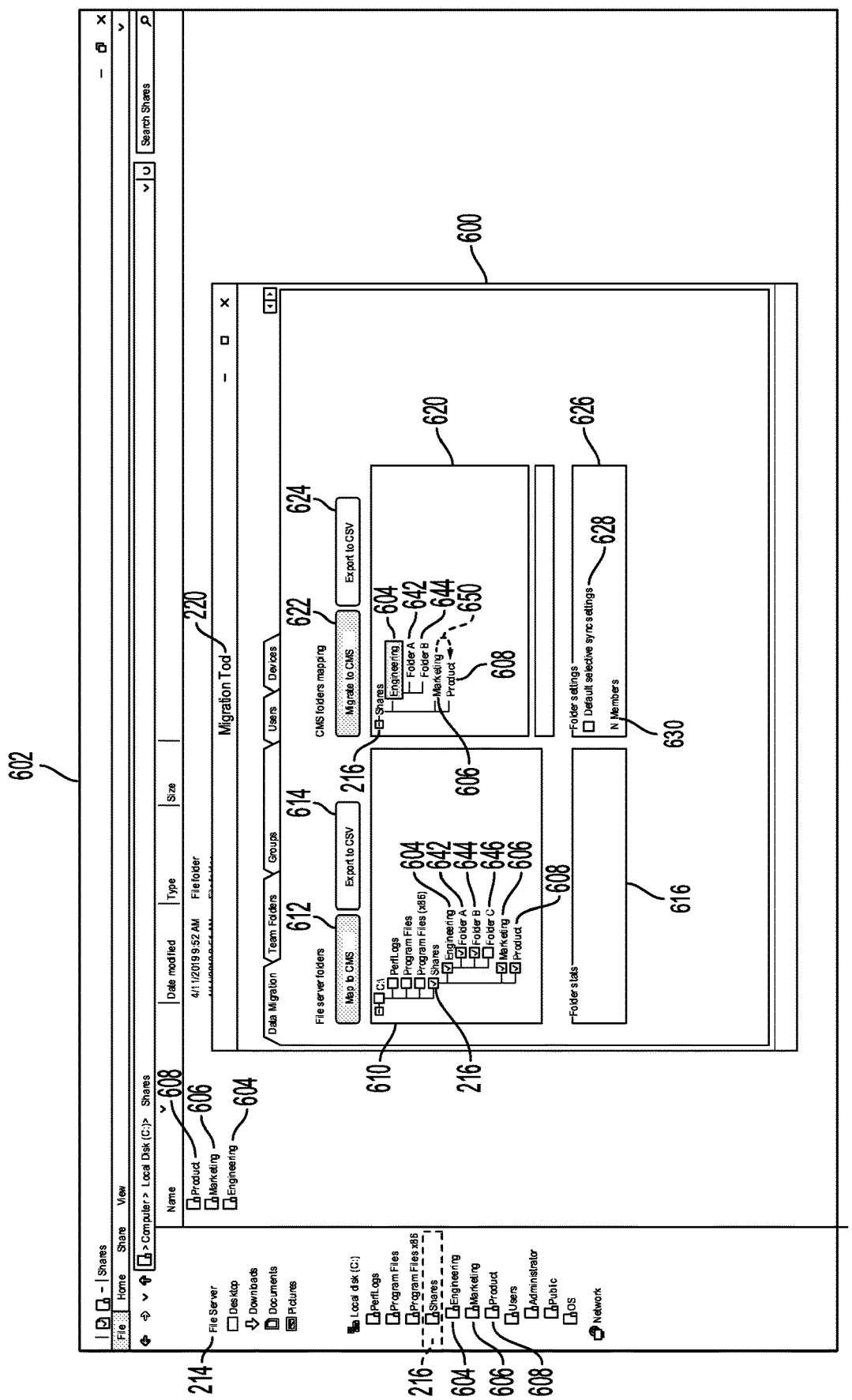

With reference to FIG. 6B, migration tool interface 600 can allow users to manually select or deselect content items in migration source section 610 to further define or customize which content items to migrate. This can allow a user to migrate an entire directory, folder, share, or structure; or select specific content items such as child or nested content items, to exclude when migrating content items. For example, in FIG. 6B, the user has selected shares 216 for migration. Within shares 216, the user has selected engineering share 604, marketing share 606, and product share 608. The user has also selected folders 642 and 644 within engineering share 604, but deselect (or not selected) folder 646 from engineering share 604. Thus, when engineering share 604 is migrated, the migration can include folders 642 and 644 but exclude folder 646. If the user decides not to migrate another content item, such as marketing share 606, for example, the user can deselect that content item (e.g., marketing share 606) from migration source section 610 to exclude it from the migration.

When the user selects map option 612, the content items selected for migration from migration source section 610 (e.g., shares 216, folder 642, folder 644) are then mapped to migration target section 620, as previously explained. Migration target section 620 can depict the content items selected for migration and the structure/hierarchies of such content items. In some examples, the user can manipulate the structure/hierarchies of the content items in migration target section 620 to reconfigure the structure/hierarchies used to migrate such content items. For example, the user can move 650 marketing share 606 inside of product share 608 so that marketing share 606 is nested within product share 608 when it is migrated to content management system 110.

Figure 6C:
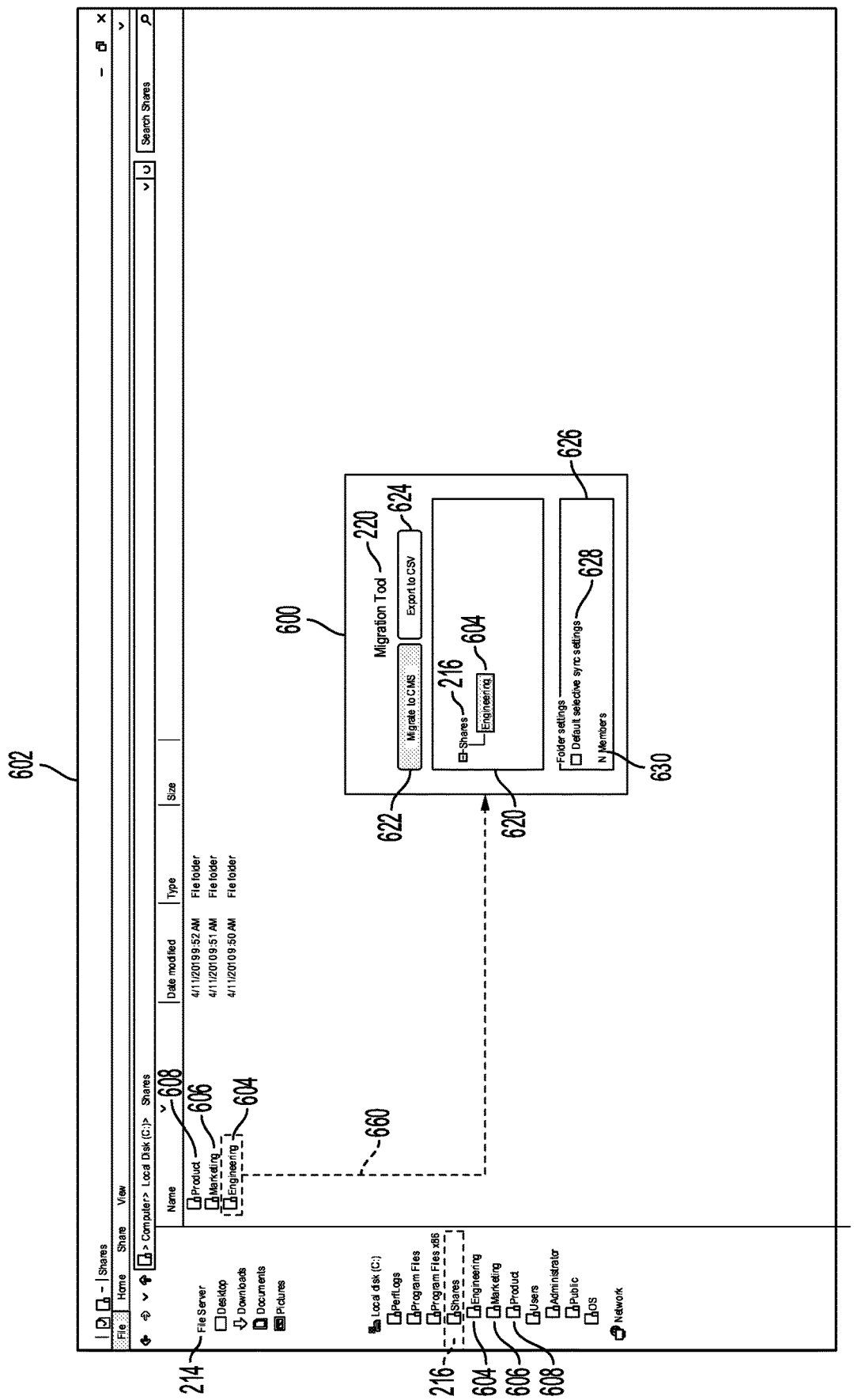

Turning to FIG. 6C, in some cases, instead of (or in addition to) mapping content items to migration target section 620 via migration source section 610 and map option 612, a user can drag and drop 660 specific content items from file explorer 602 to migration target section 620. For example, the user can drag and drop 660 engineering share 604 from file explorer 602 to migration target section 620. The user can then configure, adjust, and/or initiate the migration process as previously explained.

Figure 7:
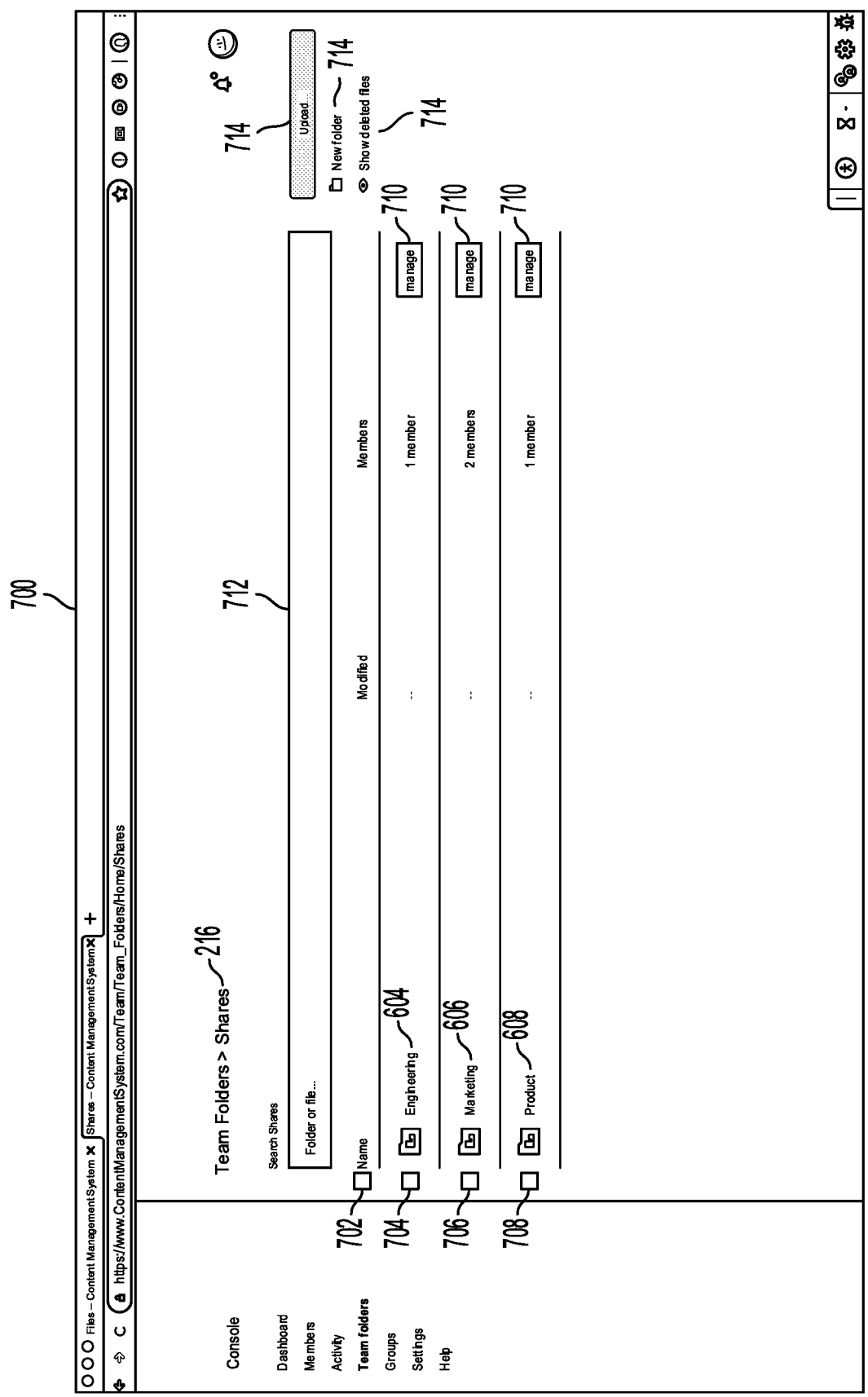
FIG. 7 shows an example interface depicting migrated shares in a content management system, in accordance with some examples.

FIG. 7 shows example interface 700 depicting migrated shares 314 in content management system 100. Migrated shares 314 correspond to shares 216 in source environment 202, which have been migrated to content management system 110 using migration tool interface 600. In this example, migrated shares 314 includes folders 604-608, as depicted in interface 700. Folders 604-608 represent specific shares within shares 216 that have been migrated to content management system 110 as part of migrated shares 314. Moreover, folders 604-608 can be configured as folders, directories, and/or namespaces in content management system 110, as previously explained.

Interface includes a selection option 702 for selecting all shares 604-608 in order to perform an action/operation for folders 604-608, and individual selection options 704-708 for selecting individual folders from folders 604-608 to perform an action/operation for the selected folders. In some cases, a user account can select manage option 710 for a particular or selected folder to perform such action/operation for that folder.

Non-limiting examples of actions that can be performed for a selected folder can include sharing the folder, downloading a local copy of the folder, tagging the folder, starring the folder, renaming the folder, moving the folder, coping the folder, deleting the folder, accessing or creating events related to the folder, rewinding the folder to a previous version/state, viewing the folder, changing one or more properties of the folder, seeing the folder memberships (e.g., which user accounts or team members have access to the folder), seeing or modifying the access levels of members of the folder, etc. In some examples, the types of actions/operations available for a selected folder can depend on the access levels to the folder defined for the particular user account selecting and accessing the folder.

In some examples, interface 700 can include a search function 712 that allows a user account to search contents within migrated shares 314. Moreover, in some cases, interface 700 can include one or more action options 714, which a user account can select to perform one or more actions/operations within interface 700 (e.g., within the current view such as migrated shares 314). Non-limiting examples of actions/operations that can be performed using one or more action options 714 can include uploading content items (e.g., folders, files, etc.), creating new content items, creating new shared content items, showing deleted content items, rewinding the content items within the current view in interface 700 to a prior version/state, etc.

Figure 8:
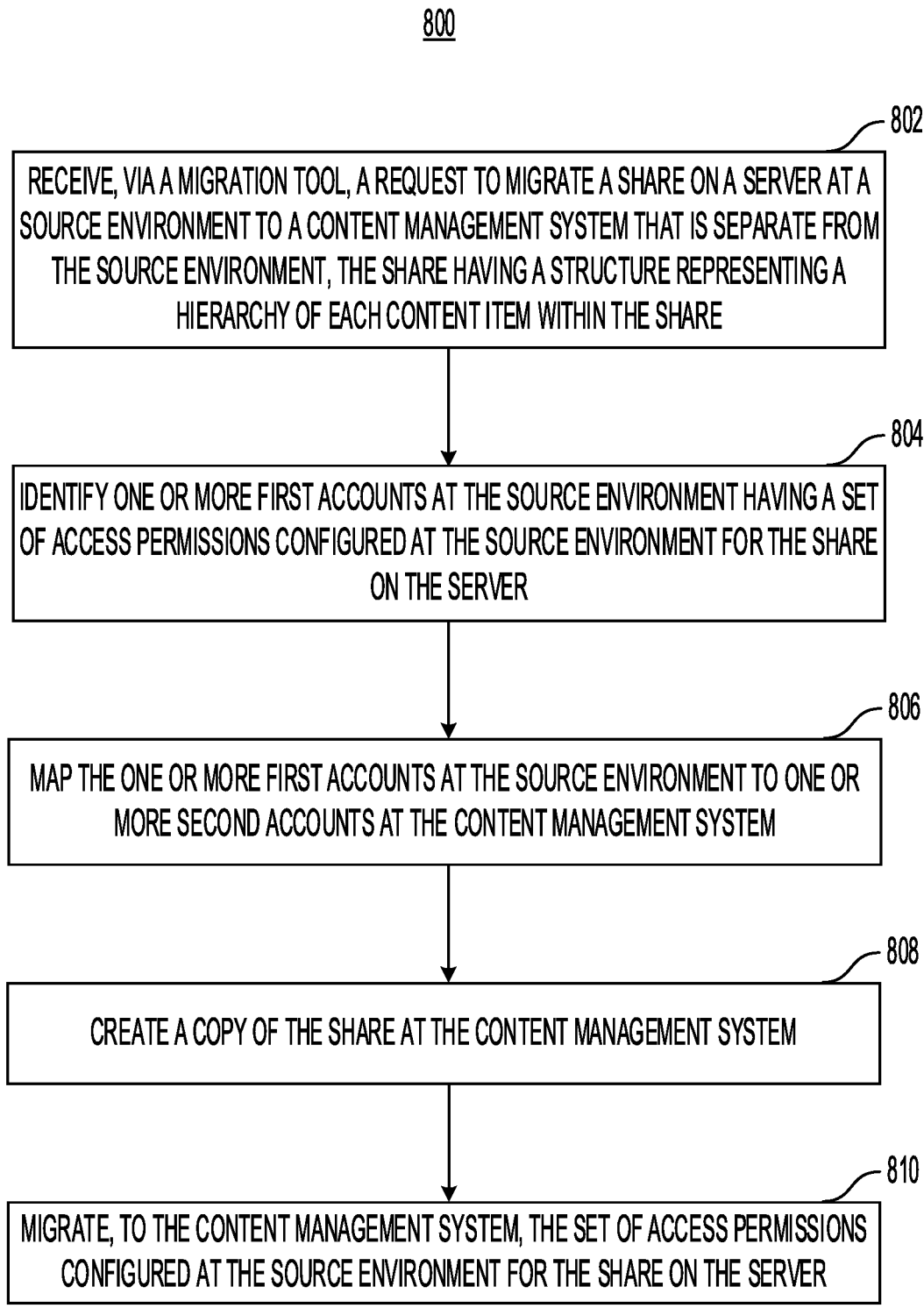
FIG. 8 shows an example method for migrating content items from a source environment to a content management system, in accordance with some examples.

Having disclosed example system components and concepts, the disclosure now turns to example method 800 for migrating content items from a source environment (202) to a content management system (110), as shown in FIG. 8. The steps outlined herein are non-limiting examples provided for illustration purposes, and can be implemented in any combination thereof, including combinations that exclude, add, or modify certain steps.

At step 802, the method 800 can include receiving, via a migration tool (e.g., 220), a request to migrate a share (e.g., 216, 604, 606, 608, etc.) on a server (e.g., 214) at a source environment (e.g., 220) to a content management system (e.g., 110) that is separate from the source environment, the share having a structure representing a hierarchy of each content item within the share. In some examples, the request can be received from a user account at the content management system via a user interface (e.g., 700) of the migration tool. Moreover, in some examples, the structure of the share can be a directory structure and/or a structure of nested content items.

At step 804, the method 800 can include identifying one or more first accounts (e.g., one or more users 206) at the source environment having a set of access permissions (e.g., 504, 506, 510, 512, etc.) configured at the source environment for the share on the server. In some examples, identifying the one or more first accounts at the source environment having the set of access permissions can include identifying the set of access permissions to the share configured at the source environment for the one or more first accounts.

For example, in some cases, identifying the one or more first accounts having the set of access permissions can include determining what specific access permissions to the share are defined for the one or more first accounts at the source environment. In some cases, the specific access permissions and/or the one or more first accounts can be identified or retrieved from the server on the source environment, the shares on the source environment, a directory service (e.g., 204) on the source environment, and/or a global account and/or permissions management system on the source environment.

At step 806, the method 800 can include mapping the one or more first accounts at the source environment to one or more second accounts (e.g., one or more teams 224) at the content management system. In some examples, an account from the one or more first accounts at the source environment can include a group account and an account from the one or more second accounts at the content management system can be associated with a team of user accounts registered at the content management system. In some cases, the account from the one or more second accounts can be a team account or construct at the content management system. The team account can contain or be associated with a group of user accounts from the content management system.

At step 808, the method 800 can include creating a copy of the share (e.g., migrated share 314) at the content management system. The copy of the share can be created in association with the one or more second accounts on the content management system. For example, the copy of the share can be created and stored on or for the one or more second accounts the content management system. In some examples, the copy of the share can be created on, or in association with, one or more namespaces at the content management system that are associated with the one or more second accounts.

In some examples, the copy of the share can be created at the content management system according to the structure (e.g., the directory structure or folder hierarchies) associated with the share at the source environment. Moreover, creating the copy of the share can include storing a copy of one or more content items in the share within the copy of the share. The copy of the one or more content items in the share can be stored according to the structure associated with the share at the source environment. In other words, the copy of the share and the one or more content items stored in the copy of the share can retain the structure and/or hierarchies of the share and associated content items in the source environment.

In some examples, the copy of the share can be created at the content management system according to a different structure (e.g., the directory structure or folder hierarchies) than the structure of the share at the source environment. For example, the data migration tool can suggest the structure of the share at the source environment as the structure to apply to, or implement for, the copy of the share at the content management system. However, a user account may request or select a different structure for the copy of the share. The data migration tool can then create the copy of the share according to the different structure selected or requested by the user account.

In some cases, such restructuring of the copy of the share can create or trigger changes in the access permissions of the content items in the copy of the share. For example, when moving a folder within the copy of the share to a different location within the copy of the share, the move can cause the folder to inherit one or more access permissions from a new parent content item of the folder at the moved location. Such inherited access permissions may differ from the access permissions that the folder would have if maintained at its original, relative location within the copy of the share. In those cases, the data migration tool can keep the access permissions for the folder as modified by the inherited access permissions, change the access permissions for the folder to the original access permissions that the folder would have at its original location, or otherwise reconcile any differences or conflicts between the access permissions associated with the original location and the moved location.

In some cases, the data migration tool can also modify access permission associated with the parent content item of the moved folder (or any other type of content item) to ensure the access levels to the moved folder are retained. For example, if Team A at the content management system has permissions to access Folder A and Folder A is moved inside of Folder B but Folder B does not have traverse permissions configured for Team A at the content management system, the move of Folder A inside of Folder B can cause Team A to lose access to Folder A, as Team A does not have permission to navigate/traverse Folder B in order to access Folder A. Thus, Folder A may become inaccessible to Team A at the content management system. Accordingly, in some cases, the data migration tool can modify the access permissions of Folder B to provide traversal rights to Team A in order to allow Team A to access Folder A from Folder B.

In some cases, the copy of the share created at the content management system can include all of the content items in the share at the source environment. In other cases, the copy of the share created at the content management system can include only a subset of all of the content items in the share at the source environment. For example, in some cases, the one or more content items associated with the copy of the one or more content items stored within the copy of the share can include a subset of content items from the share selected by a user account via a user interface associated with the data migration tool.

In some examples, the copy of the share can be created at the content management system as a namespace associated with the one or more second accounts and/or in association with the namespace. In other examples, the copy of the share can be created at the content management system as a shared folder or directory.

At step 810, the method 800 can include migrating, to the content management system, the set of access permissions configured at the source environment for the share on the server. In some examples, migrating the set of access permissions can include applying a matching or translated set of permissions at the content management system to the migrated copy of the share on the content management system.

In some cases, migrating the set of access permissions to the content management system can include mapping the set of access permissions at the source environment to a second set of access permissions (e.g., 400, 522, 526, etc.) available at the content management system and applying, to the copy of the share on the content management system, the second set of access permissions. In some examples, the second set of permissions can be applied to the one or more second accounts at the content management system. For example, the one or more second accounts at the content management system can be configured with the second set of permissions to the copy of the share on the content management system.

In some cases, one or more of the set of access permissions at the source environment can include one or more first types of access permissions implemented at the source environment and one or more of the second set of access permissions at the content management system can include one or more second types of access permissions implemented at the content management system. For example, one or more of the set of access permissions at the source environment can be based on a specific type of permissions construct or policy implemented at the source environment, and one or more of the second set of permissions at the content management system can be based on a different type of permissions construct or policy implemented at the content management system. To illustrate, the set of access permissions at the source environment can include a read-only permission and the second set of access permissions at the content management system can include a view and traverse permission.

In some cases, mapping the set of access permissions at the source environment to the second set of access permissions available at the content management system can include translating the one or more first types of access permissions implemented at the source environment to the one or more second types of access permissions implemented at the content management system. For example, mapping the set of access permissions at the source environment to the second set of access permissions available at the content management system can include translating a read-only permission from the source environment to a view and traverse permission available at, and/or implemented by, the content management system.

In some examples, migrating the set of access permissions configured at the source environment for the share on the server can include identifying the set of access permissions to the share configured at the source environment for the one or more first accounts. In some cases, the set of access permissions can include one or more access share permissions (e.g., 504, 510) and one or more filesystem permissions (e.g., 506, 512). The migrating of the set of access permissions can also include determining actual access privileges (e.g., 508, 514) provided to the one or more first accounts by a combination of the one or more share permissions and the one or more filesystem permissions, converting the actual access privileges to a second set of access permissions (e.g., 522, 526) implemented at the content management system, and applying the second set of access permissions to the copy of the share on the content management system. In some examples, the second set of permissions can be applied to the one or more second accounts at the content management system. For example, the one or more second accounts can be configured with the second set of permissions to the copy of the share.

In some cases, creating the copy of the share at the content management system and migrating the set of access permissions can include creating a log of a migration of the share and set of access permissions from the source environment to the content management system, detecting an interruption of the migration of the share and the set of access permissions, determining a point of interruption of the migration based on the log of the migration, and resuming the migration from the point of interruption. The interruption can include or cause, for example, a failure to complete the migration of the share and the set of access permissions.

Figure 9:
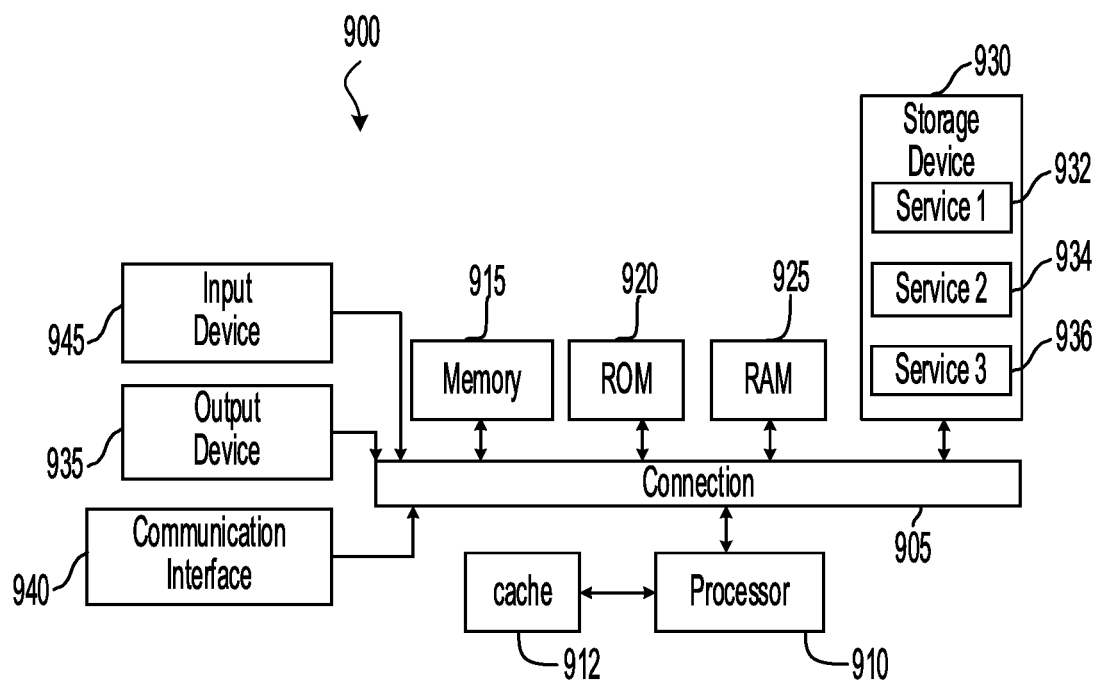
FIG. 9 shows an example system for implementing various aspects of the present technology.

FIG. 9 shows an example of computing system 900, which can be for example any computing device making up client device 150, content management system 110 or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B. In other words, claim language reciting "at least one of A and B" means A and/or B.

What is claimed is:

1. A method comprising:
   receiving, via a data migration tool, a request to migrate a share on a server at a source environment to a content management system that is separate from the source environment, the share having a structure representing a hierarchy of each content item within the share;
   identifying one or more first accounts at the source environment having a set of access permissions configured at the source environment for the share on the server;
   mapping each first account from the one or more first accounts at the source environment to a respective second account from one or more second accounts at the content management system;
   creating a copy of the share at the content management system, the copy of the share being created in association with the one or more second accounts on the content management system; and
   migrating, to the content management system, the set of access permissions configured at the source environment for the share on the server.

2. The method of claim 1, wherein the first account from the one or more first accounts at the source environment corresponds to a same user or group as the respective second account from the one or more second accounts at the content management system, wherein identifying one or more first accounts at the source environment having the set of access permissions configured for the share on the server comprises:
   identifying the set of access permissions to the share configured at the source environment for the one or more first accounts.

3. The method of claim 2, wherein migrating the set of access permissions to the content management system comprises:
   mapping the set of access permissions at the source environment to a second set of access permissions available at the content management system; and
   applying, to the copy of the share on the content management system, the second set of access permissions, the second set of permissions being applied to the one or more second accounts at the content management system.

4. The method of claim 3, wherein one or more of the set of access permissions at the source environment comprise one or more first types of access permissions implemented at the source environment and one or more of the second set of access permissions at the content management system comprise one or more second types of access permissions implemented at the content management system.

5. The method of claim 4, wherein mapping the set of access permissions at the source environment to the second set of access permissions available at the content management system comprises:
   translating the one or more first types of access permissions implemented at the source environment to the one or more second types of access permissions implemented at the content management system.

6. The method of claim 1, wherein migrating the set of access permissions configured at the source environment for the share on the server comprises:
   identifying the set of access permissions to the share configured at the source environment for the one or more first accounts, wherein the set of access permissions comprises one or more access share permissions and one or more filesystem permissions;
   determining actual access privileges provided to the one or more first accounts by a combination of the one or more share permissions and the one or more filesystem permissions;
   converting the actual access privileges to a second set of access permissions implemented at the content management system; and
   applying the second set of access permissions to the copy of the share on the content management system, the second set of permissions being applied to the one or more second accounts at the content management system.

7. The method of claim 1, wherein at least one of the one or more first accounts at the source environment comprises a group account, and wherein at least one of the one or more second accounts at the content management system is associated with a team of user accounts registered at the content management system.

8. The method of claim 1, wherein creating the copy of the share at the content management system comprises:
   creating the copy of the share according to the structure associated with the share at the source environment; and
   storing a copy of one or more content items in the share within the copy of the share, the copy of the one or more content items in the share being stored according to the structure associated with the share at the source environment.

9. The method of claim 8, wherein the one or more content items associated with the copy of one or more content items stored within the copy of the share comprise a subset of content items selected from the share via a user interface associated with the data migration tool, and wherein the copy of the share is created at the content management system as at least one of a namespace or a folder.

10. The method of claim 1, wherein creating the copy of the share at the content management system and migrating the set of access permissions comprise:
    creating a log of a migration of the share and set of access permissions from the source environment to the content management system;
    detecting an interruption of the migration of the share and the set of access permissions, the interruption causing a failure to complete the migration of the share and the set of access permissions;
    determining a point of interruption of the migration based on the log of the migration; and
    resuming the migration from the point of interruption.

11. A system comprising:
    one or more processors; and
    at least one non-transitory computer-readable medium having stored therein instructions which, when executed by the one or more processors, cause the system to:
    receive, via a data migration tool, a request to migrate a share on a server at a source environment to a content management system that is separate from the source environment, the share having a structure representing a hierarchy of each content item within the share;

identify one or more first accounts at the source environment having a set of access permissions configured at the source environment for the share on the server;

map each first account from the one or more first accounts at the source environment to a respective second account from one or more second accounts at the content management system;

create a copy of the share at the content management system, the copy of the share being created in association with the one or more second accounts on the content management system; and migrate, to the content management system, the set of access permissions configured at the source environment for the share on the server.

12. The system of claim 11, wherein identifying one or more first accounts at the source environment having the set of access permissions configured for the share on the server comprises identifying the set of access permissions to the share configured at the source environment for the one or more first accounts, and wherein migrating the set of access permissions to the content management system comprises:

mapping the set of access permissions at the source environment to a second set of access permissions available at the content management system; and applying, to the copy of the share on the content management system, the second set of access permissions, the second set of permissions being applied to the one or more second accounts at the content management system.

13. The system of claim 12, wherein one or more of the set of access permissions at the source environment comprise one or more first types of access permissions implemented at the source environment and one or more of the second set of access permissions at the content management system comprise one or more second types of access permissions implemented at the content management system.

14. The system of claim 13, wherein mapping the set of access permissions at the source environment to the second set of access permissions available at the content management system comprises:

translating the one or more first types of access permissions implemented at the source environment to the one or more second types of access permissions implemented at the content management system.

15. The system of claim 11, wherein migrating the set of access permissions configured at the source environment for the share on the server comprises:

identifying the set of access permissions to the share configured at the source environment for the one or more first accounts, wherein the set of access permissions comprises one or more access share permissions and one or more filesystem permissions;

determining actual access privileges provided to the one or more first accounts by a combination of the one or more share permissions and the one or more filesystem permissions;

converting the actual access privileges to a second set of access permissions implemented at the content management system; and applying the second set of access permissions to the copy of the share on the content management system, the second set of permissions being applied to the one or more second accounts at the content management system.

16. The system of claim 11, wherein at least one of the one or more first accounts at the source environment comprises a group account, wherein at least one of the one or more second accounts at the content management system is associated with a team of user accounts registered at the content management system, and wherein creating the copy of the share at the content management system comprises:

creating the copy of the share according to the structure associated with the share at the source environment; and storing a copy of one or more content items in the share within the copy of the share, the copy of the one or more content items in the share being stored according to the structure associated with the share at the source environment.

17. The system of claim 11, wherein creating the copy of the share at the content management system and migrating the set of access permissions comprise:

creating a log of a migration of the share and set of access permissions from the source environment to the content management system;

detecting an interruption of the migration of the share and the set of access permissions, the interruption causing a failure to complete the migration of the share and the set of access permissions;

determining a point of interruption of the migration based on the log of the migration; and resuming the migration from the point of interruption.

18. At least one non-transitory computer-readable medium comprising instructions that, when executed by one or more processors, cause the one or more processors to:

receive, via a data migration tool, a request to migrate a share on a server at a source environment to a content management system that is separate from the source environment, the share having a structure representing a hierarchy of each content item within the share;

identify one or more first accounts at the source environment having a set of access permissions configured at the source environment for the share on the server;

map each first account from the one or more first accounts at the source environment to a respective second account from one or more second accounts at the content management system;

create a copy of the share at the content management system, the copy of the share being created in association with the one or more second accounts on the content management system; and migrate, to the content management system, the set of access permissions configured at the source environment for the share on the server.

19. The at least one non-transitory computer-readable medium of claim 18, wherein creating the copy of the share at the content management system and migrating the set of access permissions comprise:

creating a log of a migration of the share and set of access permissions from the source environment to the content management system;

detecting an interruption of the migration of the share and the set of access permissions, the interruption causing a failure to complete the migration of the share and the set of access permissions; and determining a point of interruption of the migration based on the log of the migration; and resuming the migration from the point of interruption.

20. The non-transitory computer-readable medium of claim 18, wherein identifying one or more first accounts at the source environment having the set of access permissions configured for the share on the server comprises identifying the set of access permissions to the share configured at the source environment for the one or more first accounts, and wherein migrating the set of access permissions to the content management system comprises:

- mapping the set of access permissions at the source environment to a second set of access permissions available at the content management system, the mapping comprising translating at least one of the set of access permissions from a first type of access permissions implemented by the source environment to a second type of access permissions implemented by the content management system; and
- applying, to the copy of the share on the content management system, the second set of access permissions, the second set of permissions being applied to the one or more second accounts at the content management system.

* * * * *